(12) United States Patent
Welton et al.

(10) Patent No.: US 7,308,939 B2
(45) Date of Patent: Dec. 18, 2007

(54) METHODS OF USING POLYMER-COATED PARTICULATES

(75) Inventors: Thomas D. Welton, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 313 days.

(21) Appl. No.: 11/076,073

(22) Filed: Mar. 9, 2005

(65) Prior Publication Data

US 2006/0201673 A1    Sep. 14, 2006

(51) Int. Cl.
*E21B 43/267* (2006.01)
*E21B 43/22* (2006.01)

(52) U.S. Cl. ............... 166/280.2; 166/280.1; 166/295; 166/305.1; 166/308.2; 507/225; 507/230; 507/231; 507/904; 507/924; 427/221; 428/407

(58) Field of Classification Search ............. 166/280.1, 166/280.2, 295, 305.1, 308.2, 308.3; 427/221; 428/407; 507/225, 230, 231, 904, 924
See application file for complete search history.

(56) References Cited

U.S. PATENT DOCUMENTS 4,040,967 A    8/1977    Nimerick et al.
4,417,989 A    11/1983   Hunter
6,488,091 B1   12/2002   Weaver et al. .............. 166/300
6,817,414 B2 * 11/2004   Lee ............................ 166/278

FOREIGN PATENT DOCUMENTS

EP    0 933 414 A1    8/1999

OTHER PUBLICATIONS

Foreign communication related to a counterpart application dated Mar. 9, 2005.

* cited by examiner

*Primary Examiner*—George Suchfield
(74) *Attorney, Agent, or Firm*—Robert A. Kent; Baker Botts, L.L.P.

(57) ABSTRACT

Methods are provided including a method comprising: providing a treatment fluid comprising particulates at least partially coated with a polymer, wherein the polymer is deposited on the particulates by at least partially coating the particulates with a polymer solution comprising the polymer and a solvent and then exposing the particulates to an aqueous medium such that the solvent substantially dissociates from the polymer solution and such that the polymer substantially remains on the particulates; introducing the treatment fluid into a portion of a subterranean formation; and, depositing at least a portion of the particulates in the portion of the subterranean formation.

18 Claims, No Drawings

METHODS OF USING POLYMER-COATED PARTICULATES

CROSS-REFERENCE TO RELATED APPLICATIONS

The present invention is related to U.S. application Ser. No. 11/076,005 entitled "Polymer-Coated Particulates" filed on the same date herewith, which is assigned to the assignee of the present invention, the entire disclosure of which is incorporated herein by reference.

BACKGROUND OF THE INVENTION

The present invention relates to methods of using polymer-coated particulates in subterranean operations such as gravel packing, frac-packing, and hydraulic fracturing.

Hydrocarbon-producing wells are often stimulated by hydraulic fracturing treatments. In hydraulic fracturing treatments, a viscous fracturing fluid is pumped into a producing zone at a rate and pressure such that the subterranean formation breaks down and one or more fractures are formed or extended in the zone. Particulate solids, such as graded sand, which are often referred to as "proppant" may be suspended in a portion of the fracturing fluid and then deposited in the fractures when the fracturing fluid is converted to a thin fluid to be returned to the surface. These particulates serve, among other things, to prevent the fractures from fully closing so that conductive channels are formed through which produced hydrocarbons may flow.

Hydrocarbon-producing wells may also undergo gravel packing treatments to, inter alia, reduce the migration of unconsolidated formation particulates into the well bore. In gravel packing operations, particulates, often referred to in the art as gravel, are suspended in a treatment fluid, which may be viscosified, and the treatment fluid is pumped into a well bore in which the gravel pack is to be placed. As the particulates are placed in or near the zone, the treatment fluid either is returned to the surface or leaks off into the subterranean zone. The resultant gravel pack acts as a filter to prevent the production of the formation solids with the produced fluids. Traditional gravel pack operations involve placing a gravel pack screen in the well bore and then packing the surrounding annulus between the screen and the well bore with gravel. The gravel pack screen is generally a filter assembly used to support and retain the gravel placed during the gravel pack operation. A wide range of sizes and screen configurations is available to suit the characteristics of a well bore, the production fluid, and any particulates in the subterranean formation.

In some situations, hydraulic fracturing and gravel packing operations may be combined into a single treatment. Such treatments are often referred to as "frac pack" operations. In some cases, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Particulates (such as proppant or gravel) used in subterranean operations are often coated with a resinous or polymeric material to facilitate consolidation of the particulates. In some cases, the coating may also be used to strengthen low-quality particulates. Creating such coated particulates generally involves using solvent methods that may pose health or environments risks. Moreover, many particulate coating technologies, such as epoxy resin solvent systems, are relatively expensive. Thus, between the potential environmental and health hazards posed by many of the particulate coating technologies and the exorbitant costs of some, known coating techniques are less than ideal for widespread use in subterranean operations.

SUMMARY OF THE INVENTION

The present invention relates to methods of using polymer-coated particulates in subterranean operations such as gravel packing, frac-packing, and hydraulic fracturing.

One embodiment of the present invention provides methods for depositing a polymer on particulates suitable for use in a subterranean operation comprising providing particulates and a polymer solution comprising a polymer and a polar, aprotic solvent; at least partially coating the particulates with the polymer solution to create coated particulates; and, exposing the coated particulates to an aqueous medium such that the solvent substantially dissociates from the polymer solution and such that the polymer substantially remains on the particulates.

Another embodiment of the present invention provides methods of treating a subterranean formation comprising providing a treatment fluid comprising particulates at least partially coated with a polymer, wherein the polymer is deposited on the particulates by at least partially coating the particulates with a polymer solution comprising the polymer and a solvent and then exposing the particulates to an aqueous medium such that the solvent substantially dissociates from the polymer solution and such that the polymer substantially remains on the particulates; introducing the treatment fluid into a portion of a subterranean formation; and, depositing at least a portion of the particulates in the portion of the subterranean formation.

Yet another embodiment of the present invention provides methods of creating a propped fracture in a portion of a subterranean formation comprising hydraulically fracturing a portion of a subterranean formation to create or enhance at lease one fracture therein; providing a fracturing fluid comprising particulates at least partially coated with a polymer, wherein the polymer is deposited on the particulates by at least partially coating the particulates with a polymer solution comprising the polymer and a solvent and then exposing the particulates to an aqueous medium such that the solvent substantially dissociates from the polymer solution and such that the polymer substantially remains on the particulates; placing the fracturing fluid into the at least one fracture; and, depositing at least a portion of the particulates in the at least one fracture.

The features and advantages of the present invention will be readily apparent to those skilled in the art upon a reading of the description of the preferred embodiments that follows.

DESCRIPTION OF PREFERRED EMBODIMENTS

The present invention relates to methods of using polymer-coated particulates in subterranean operations such as gravel packing, frac-packing, and hydraulic fracturing.

In accordance with the teachings of the present invention, particulates at least partially coated with a polymer may be used to facilitate the consolidation of the particulates into a permeable mass having compressive and tensile strength. Generally, the polymer is deposited onto the particulates by at least partially coating the particulates with a polymer solution comprising a polymer and a solvent, and then exposing the particulates to an aqueous medium such that the solvent substantially dissociates from the polymer solution, leaving behind the polymer on the particulates. Suitable polymers are substantially soluble or miscible in the chosen solvent and are not substantially soluble or miscible in water. Suitable solvents are substantially soluble or miscible in water. In some embodiments of the present invention, particulates may be coated with the polymer in an amount of from about 0.1% to about 25% by weight of the particulates. In other embodiments of the present invention, particulates may be coated with the polymer in an amount of from about 1% to about 5% by weight of the particulates. In particular embodiments, the present invention provides a low-cost and environmentally-sound method of coating particulates with a polymer that may improve the quality of low-quality particulates and/or may improve the resiliency and crush resistance of a resulting particulate pack.

Particulates suitable for use in the present invention may be comprised of any material suitable for use in subterranean operations. Suitable particulate materials include, but are not limited to, sand; bauxite; ceramic materials; glass materials; polymer materials; polytetrafluoroethylene (TEFLON®) materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable, suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Typically, the coated particulates have a size in the range of from about 2 to about 400 mesh, U.S. Sieve Series. In particular embodiments, preferred coated particles size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture, are often included in proppant and gravel treatments. It should be understood that the term "proppant," as used in this disclosure, includes all known shapes of materials including substantially spherical materials, fibrous materials, polygonal materials (such as cubic materials) and mixtures thereof.

Some embodiments of the present invention are particularly well-suited for use with low-quality particulates. By their nature, low-quality particulates are often plagued by fines and/or breakage, making their use with a consolidating or strengthening polymeric coating advantageous. As used herein, the term "low-quality particulates" refers to particulates that do not meet at least one of the standards for sphericity, roundness, size, turbidity, acid solubility, percentage of fines, or crush resistance as recited in American Petroleum Institute Recommended Practices (API RP) standard numbers 56 and 58 for proppant and gravel respectively.

The API RP's describe the minimum standard for sphericity as at least 0.6 and for roundness as at least 0.6. As used herein, the terms "sphericity" and "roundness" are defined as described in the API RP's and can be determined using the procedures set forth in the API RP's.

API RP 56 also sets forth some commonly recognized proppant sizes as 6/12, 8/16, 12/20, 20/40, 30/50, 40/70, and 70/140. Similarly, API RP 58 also sets forth some commonly recognized gravel sizes as 8/16, 12/20, 16/30, 20/40, 30/50, and 40/60. The API RP's further note that a minimum percentage of particulates that should fall between designated sand sizes and that not more than 0.1 weight % of the particulates should be larger than the larger sand size and not more than a maximum percentage (1 weight % in API RP 56 and 2 weight % in API RP 58) should be smaller than the small sand size. Thus, for 20/40 proppant, no more than 0.1 weight % should be larger than 20 U.S. Mesh and no more than 1 weight % smaller than 40 U.S. Mesh.

API RP's 56 and 58 describe the minimum standard for proppant and gravel turbidity as 250 FTU or less. API RP 56 describes the minimum standard for acid solubility of proppant as no more than 2 weight % loss when tested according to API RP 56 procedures for proppant sized between 6/12 Mesh and 30/50 Mesh, U.S. Sieve Series and as no more than 3 weight % loss when tested according to API RP 56 procedures for proppant sized between 40/70 Mesh and 70/140 Mesh, U.S. Sieve Series. API RP 58 describes the minimum standard for acid solubility of gravel as no more than 1 weight % loss when tested according to API RP 58 procedures. API RP 56 describes the minimum standard for crush resistance of proppant as producing not more than the suggested maximum fines as set forth in Table 1, below, for the size being tested:

TABLE 1

Suggested Maximum Fines for Proppant Subjected to Crushing Strength

| Mesh Size (U.S. Sieve Series) | Crushing Force (lbs) | Stress on Proppant (psi) | Maximum Fines (% by weight) |
| --- | --- | --- | --- |
| 6/12 | 6,283 | 2,000 | 20 |
| 8/16 | 6,283 | 2,000 | 18 |
| 12/20 | 9,425 | 3,000 | 16 |
| 16/30 | 9,425 | 3,000 | 14 |
| 20/40 | 12,566 | 4,000 | 14 |
| 30/50 | 12,566 | 4,000 | 10 |
| 40/70 | 15,708 | 5,000 | 8 |
| 70/140 | 15,708 | 5,000 | 6 |

Similarly, API RP 58 describes the minimum standard for crush resistance of gravel as producing not more than the suggested maximum fines as set forth in Table 2, below, for the size being tested:

TABLE 2

Suggested Maximum Fines for Gravel Subjected to Crushing Strength

| Mesh Size (U.S. Sieve Series) | Crushing Force (lbs) | Stress on Gravel (psi) | Maximum Fines (% by weight) |
| --- | --- | --- | --- |
| 8/16 | 6,283 | 2,000 | 8 |
| 12/20 | 6,283 | 2,000 | 4 |
| 16/30 | 6,283 | 2,000 | 2 |
| 20/40 | 6,283 | 2,000 | 2 |
| 30/50 | 6,283 | 2,000 | 2 |
| 40/60 | 6,283 | 2,000 | 2 |

As mentioned above, the particulates of the present invention are at least partially coated with a polymer solution comprising a polymer and a solvent. Generally, any polymer that has a thermal and chemical resistance suitable for use in a down hole environment and that may aid particulates in forming a permeable mass having at least some cohesive strength may be used in accordance with the teachings of the present invention. Suitable polymers are not readily soluble in water and may be made into a solution in a suitable solvent (such as propylene carbonate) and then may be made to precipitate out of the solvent when placed in an aqueous fluid (such as a fracturing fluid). By way of example, a solution can be made by dissolving acrylic fibers (containing at least about 85% acrylonitrile units) into N,N-dimethylformamide ("DMF") to form a 20 weight percent solution of acrylic in DMF; when exposed to water, acrylic polymer beads precipitate out of the DMF solution and into the water.

Some suitable polymers include, but are not limited to, acrylic polymers such as acrylonitrile polymers, acrylonitrile copolymers, and mixtures thereof. Some preferred polymers include homopolymers and copolymers of polyacrylonitrile (including copolymers of acrylonitrile and methyl acrylate, methyl methacrylate, vinyl chloride, styrene and butadiene), polyacylates, polymethacrylates, poly(vinyl alcohol) and its derivates, and mixtures thereof. As used herein the term "acrylic" polymers refers to any synthetic polymer composed of at least 85% by weight of acrylonitrile units (the Federal Trade Commission definition). Thus, the definition of the term may include homopolymers of polyacrylonitrile and copolymers containing polyacrylonitrile. Usually they are copolymers of acrylonitrile and one or more of the following: methyl acrylate, methyl methacrylate, vinyl chloride, styrene, butadiene. However, polymers that do not meet the definition of an acrylic polymer (such as those having less than 85% acrylonitrile) may also be suitable. For instance, Example 3 uses poly(acrylonitrile-co-butadiene-co-styrene) that contains approximately 25 wt % acrylonitrile. Furthermore, anyone skilled in the art can select a wide variety of suitable polymers (including non-acrylic polymers) and solvents from numerous sources. For example, using published references such as the *Polymer Handbook* (J. Brandrup J. and E. H. Immergut, John Wiley & Sons, New York, 1989) one could find a polymer suitable for their application with example solvents. For example, from the reference previously cited it can be found that poly(methyl methacrylate) and poly(vinyl acetate) are soluble in acetone which is a water soluble/miscible solvent. The polymer may be present in the polymer solution in an amount from about 5 to about 95% by weight of the polymer solution. Typically, the polymer is present in the polymer solution in an amount of from about 5% to about 95% by weight of the polymer solution. In some embodiments the polymer is present in the polymer solution in an amount of from about 25% to about 75% by weight of the polymer solution.

The solvent of the present invention generally comprise polar, aprotic solvents. In particular embodiments, the solvent is non-aromatic. Suitable such solvents include, but are not limited to, N,N-dimethylformamide ("DMF"); acetone; tetrahydrofuran ("THF"); 1,4-dioxane; dimethylsulfoxide ("DMSO"); tetramethylenesulfone (sulfolane); acetonitrile; hexamethylphosphoramide ("HMPA"); 1,3-methyl-3,4,5,6-tetrahydro-2(1H)-pyrimidinone ("DMPU"); propylene carbonate, ethylene carbonate and mixtures thereof. In particular embodiments of the present invention, propylene carbonate is used as the solvent due to the fact that it is inexpensive, is relatively environmentally sound, and has a high boiling point.

After at least partially coating the particulates with the polymer solution, the polymer-coated particulates are exposed to an aqueous treatment fluid or some other source of water. Suitable aqueous media include fresh water, salt water, brine, or any other aqueous liquid that does not adversely react with the polymer or solvent of the present invention. In particular embodiments, the fracturing fluid the particulates are to be suspended in is the aqueous medium. Due to the highly water-soluble nature of the solvent, the solvent substantially, and oftentimes rapidly, dissociates from the polymer solution upon exposure to the aqueous medium Upon dissociation, the solvent enters the aqueous medium, leaving behind the polymer on the surface of the particulates. So deposited, the polymer typically is present on the resulting polymer-coated particulates in an amount of from about 0.01% to about 10% by weight of the particulates, preferably from about 1% to about 3% by weight of the particulates.

In particular embodiments of the present invention, the particulates may be coated with the polymer solution and introduced into the treatment fluid, which acts as the aqueous medium, directly prior to being introduced into a subterranean formation in an on-the-fly treatment. As used herein, the term "on-the-fly" is used to mean that a flowing stream is continuously introduced into another flowing stream so that the streams are combined and mixed while continuing to flow as a single stream as part of an on-going treatment. For instance, the polymer-coated particulates may be mixed with an aqueous liquid (such as a treatment fluid) on-the-fly to form a treatment slurry. Such mixing can also be described as "real-time" mixing. As is well understood by those skilled in the art such mixing may also be accomplished by batch or partial batch mixing. One benefit of on-the-fly mixing over batch or partial batch mixing, however, involves reducing waste by having the ability to rapidly shut down the mixing of the components on-the-fly.

Generally, any treatment fluid suitable for a subterranean operation may be used in accordance with the teachings of the present invention, including aqueous gels, viscoelastic surfactant gels, foamed gels and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In exemplary embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, inter alia, reduces fluid loss and allows the fracturing fluid to transport significant quantities of suspended particulates. The water used to form the treatment fluid may be fresh water, salt water, brine, sea water, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one metal ion that is capable of crosslinking molecules. Examples of suitable crosslinkers include, but are not limited to, zirconium compounds (such as, for example, zirconium lactate, zirconium lactate triethanolamine, zirconium acetylacetonate, zirconium citrate, and zirconium diisopropylamine lactate); titanium compounds (such as, for example, titanium lactate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place particulates in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

In some embodiments of the present invention, the particulates may be coated with the polymer solution and exposed to an aqueous medium well in advance of being introduced into a subterranean formation, creating polymer-coated particulates that may be used at some time in the future.

By coating with particulates with the polymer of the present invention, the quality of the particulates may be improved, particularly in embodiments employing low-quality particulates. In addition to improving low-quality particulates to make it suitable for a fracturing application, particular embodiments may improve the resiliency of a particulate pack comprising the polymer-coated particulates of the present invention. In particular embodiments, the resulting particulates may have improved crush resistance, may be less susceptible to point loading, and/or may be better able to withstand stress cycling. The polymer coating of the present invention may also reduce fines generation by entraining fines released by the particulates, preventing the fines negatively impacting the production potential of the well.

In particular embodiments of the present invention, the polymer-coated particulates may also be at least partially coated with a partitioning agent. By coating a partitioning agent onto particulates that has been coated with the polymer, the methods of the present invention are capable of temporarily diminishing the "tackiness" of the treated particulates, thus preventing or minimizing the agglomeration of the particulates and the spreading of the polymer onto equipment surfaces before introduction into a subterranean formation. Because of this, the use of a partitioning agent may be particularly useful where the polymer-coated particulates will not be directly introduced into a subterranean formation (i.e., in non-"on-the-fly" operations). Partitioning agents suitable for use in the present invention are those substances that will dissipate once the particulates are introduced to a treatment fluid, such as a fracturing or gravel packing fluid. Moreover, partitioning agents suitable for use in the present invention should not interfere with the polymer coated onto the particulate when it is used, and should not interfere with the treatment fluid. In particular embodiments, the partitioning agent is coated onto the polymer-coated particulates in an amount of from about 1% to about 20% by weight of the polymer-coated particulates. In particular embodiments, substantially the entire surface of the polymer coating is coated with partitioning agent.

Partitioning agents suitable for use in the present invention are those materials that are capable of coating onto the polymer coating of the particulates and reducing the tacky character of the polymer coating. Suitable partitioning agents may be substances that will quickly dissipate in the presence of the aqueous liquid. Examples of suitable partitioning agents that will dissolve quickly in an aqueous liquid include salts (such as rock salt, fine salt, KCl, and other solid salts known in the art), barium sulfate, benzoic acid, polyvinyl alcohol, sodium carbonate, sodium bicarbonate, and mixtures thereof. The partitioning agent also may be a substance that dissipates more slowly in the presence of the aqueous liquid. Partitioning agents that dissolve more slowly allow more time to place the coated particulates. Examples of suitable partitioning agents that will dissolve more slowly in an aqueous liquid include calcium oxide, degradable polymers, such as polysaccharides; chitins; chitosans; proteins; aliphatic polyesters; poly(lactides); poly (glycolides); poly($\epsilon$-caprolactones); poly(hydroxybutyrates); poly(anhydrides); aliphatic polycarbonates; poly (orthoesters); poly(amino acids); poly(ethylene oxides); and poly(phosphazenes); and mixtures thereof.

To facilitate a better understanding of the present invention, the following examples of preferred embodiments are given. In no way should the following examples be read to limit or define the scope of the invention.

EXAMPLES

Example 1

Acrylic fibers (containing at least about 85% acrylonitrile units were dissolved into N,N-dimethylformamide ("DMF") to form a 20 weight percent solution of acrylic in DMF. The solution was then dropped into water and acrylic polymer beads precipitated out of the DMF and into the water.

Example 2

Acrylic fibers (containing at least about 85% acrylonitrile units were dissolved into propylene carbonate to form a 20 weight percent solution of acrylic in propylene carbonate. Ten grams of the solution of acrylic in propylene carbonate were then coated into 100 grams of 20/40 Brady sand. The coated sand was then placed into water and propylene carbonate came out of the solution and the acrylic polymer was observed to deposit onto the surface of the sand particulate leaving an about 2% by weight coating on the polymer.

Example 3

Ten grams of poly(acrylonitrile-co-butadiene-co-styrene) (comprising about 25 weight % acrylonitrile) was dissolved in 90 grams of propylene carbonate at about 110-120° F. Three milliliters of the resulting liquid polymer solution was then coated onto about 100 grams of 20/40 Brady sand. The coated sand was then slurried into about 200 ml of an aqueous xanthan gel liquid and the poly(acrylonitrile-co-butadiene-co-styrene) polymer came out of the propylene carbonate and was deposited onto the sand when the solvent went into the aqueous xanthan gel liquid.'

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method for depositing a polymer on particulates suitable for use in a subterranean operation comprising:
    providing particulates and a polymer solution comprising a polymer and a polar, aprotic solvent;
    at least partially coating the particulates with the polymer solution to create coated particulates; and,
    exposing the coated particulates to an aqueous medium such that the solvent substantially dissociates from the polymer solution and such that the polymer substantially remains on the particulates.

2. The method of claim 1 wherein the polymer comprises at least one polymer selected from the group consisting of: polyacrylonitrile, a copolymer of acrylonitrile and methyl acrylate, a copolymer of acrylonitrile and methyl methacrylate, a copolymer of acrylonitrile and vinyl chloride, a copolymer of acrylonitrile and styrene, a copolymer of acrylonitrile and butadiene, a polyacylate, a polymethacrylate, a poly(vinyl alcohol), and a derivative of poly(vinyl alcohol).

3. The method of claim 1 wherein the solvent comprises at least one solvent selected from the group consisting of: N,N-dimethylformamide; acetone; tetrahydrofuran; 1,4-dioxane; dimethylsulfoxide; tetramethylenesulfone; acetonitrile; hexamethylphosphoramide; 1,3-methyl-3,4,5,6-tetrahydro-2(1H)-pyrimidinone; propylene carbonate, and ethylene carbonate.

4. The method of claim 1 wherein the polymer is present in the polymer solution in an amount of from about 5% to about 95% by weight of the polymer solution.

5. The method of claim 1 wherein the particulates comprise low-quality particulates.

6. The method of claim 1 wherein the particulates are coated with the polymer in an amount of from about 0.1% to about 25% by weight of the particulates.

7. The method of claim 1 wherein the aqueous medium comprises an aqueous fracturing fluid.

8. The method of claim 7 wherein the particulates are coated with the partitioning agent in an amount of from about 1% to about 20% by weight of the particulates and wherein the partitioning agent comprises at least one partitioning agent selected from the group consisting of: a salt, barium sulfate, benzoic acid, polyvinyl alcohol, sodium carbonate, sodium bicarbonate, a chitin, chitosan, protein, aliphatic polyester, poly(lactide), poly(glycolide), poly($\epsilon$-caprolactone), poly(hydroxybutyrate), poly(anhydride), aliphatic polycarbonate, poly(orthoester), poly(amino acid), poly(ethylene oxide), poly(phosphazene), degradable polymer, calcium oxide, a wax, gilsonite, sulfonated asphalt, naphthalenesulfonate, and an oil-soluble resin.

9. The method of claim 1 further comprising at least partially coating the particulates with a partitioning agent.

10. A method of treating a subterranean formation comprising:
    providing a treatment fluid comprising particulates at least partially coated with a polymer, wherein the polymer is deposited on the particulates by at least partially coating the particulates with a polymer solution comprising the polymer and a polar, aprotic solvent and then exposing the particulates to an aqueous medium such that the solvent substantially dissociates from the polymer solution and such that the polymer substantially remains on the particulates;
    introducing the treatment fluid into a portion of a subterranean formation; and,
    depositing at least a portion of the particulates in the portion of the subterranean formation.

11. The method of claim 10 wherein the treatment fluid comprises an aqueous liquid and a gelling agent.

12. The method of claim 10 wherein the polymer comprises at least one polymer selected from the group consisting of: polyacrylonitrile, a copolymer of acrylonitrile and methyl acrylate, a copolymer of acrylonitrile and methyl methacrylate, a copolymer of acrylonitrile and vinyl chloride, a copolymer of acrylonitrile and styrene, a copolymer of acrylonitrile and butadiene, a polyacylate, a polymethacrylate, a poly(vinyl alcohol), and a derivative of poly(vinyl alcohol).

13. The method of claim 10 wherein the polar, aprotic solvent comprises propylene carbonate.

14. The method of claim 13 wherein the solvent comprises at least one solvent selected from the group consisting of: N,N-dimethylformamide; acetone; tetrahydrofuran; 1,4-dioxane; dimethylsulfoxide; tetramethylenesulfone; acetonitrile; hexamethyiphosphoramide; 1,3-methyl-3,4,5,6-tetrahydro-2(1H)-pyrimidinone; propylene carbonate; and ethylene carbonate.

15. The method of claim 10 wherein the polymer is present in the polymer solution in an amount of from about 5% to about 95% by weight of the polymer solution.

16. The method of claim 10 wherein the particulates are coated with the polymer in an amount of from about 0.1% to about 25% by weight of the particulates.

17. A method of creating a propped fracture in a portion of a subterranean formation comprising:

hydraulically fracturing a portion of a subterranean formation to create or enhance at lease one fracture therein;

providing a fracturing fluid comprising particulates at least partially coated with a polymer, wherein the polymer is deposited on the particulates by at least partially coating the particulates with a polymer solution comprising the polymer and a solvent and then exposing the particulates to an aqueous medium such that the solvent substantially dissociates from the polymer solution and such that the polymer substantially remains on the particulates;

placing the fracturing fluid into the at least one fracture; and, depositing at least a portion of the particulates in the at least one fracture.

18. The method of claim 1 wherein the particulates comprise at least one particulate material selected from the group consisting of: sand; bauxite; a ceramic material; a glass material; a polymer material; a polytetrafluoroethylene material; a nut shell piece; a seed shell piece; a cured resinous particulate comprising a nut shell piece; a cured resinous particulate comprising a seed shell piece; a fruit pit piece; a cured resinous particulate comprising a fruit pit piece; and wood.

* * * * *